Figure 1:
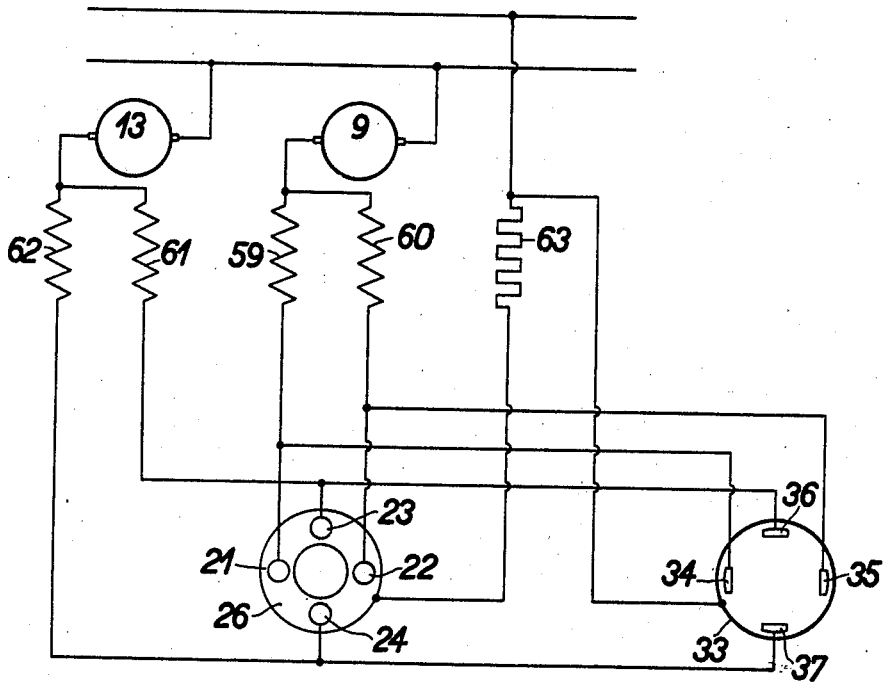

July 31, 1934.   H. SONNBERGER   1,968,266
CONTROL DEVICE FOR FOLLOWING MECHANISMS
Filed May 11, 1933   2 Sheets-Sheet 1

Inventor:

Patented July 31, 1934

1,968,266

UNITED STATES PATENT OFFICE 1,968,266

CONTROL DEVICE FOR FOLLOWING MECHANISMS

Heinrich Sonnberger, Jena, Germany, assignor to firm of Carl Zeiss, Jena, Germany Application May 11, 1933, Serial No. 670,517
In Germany May 11, 1932

5 Claims. (Cl. 172—239)

The invention concerns a control device for following mechanisms, in which the movements of a control member acting upon a motor by means of an electric contact device influence a following member coupled to this motor, and in which the control member and the following member are so coupled to each other that too slow a following of the following member, which is due to the reciprocal adjustment of the two members surpassing a definite value, causes the connection of another electric contact device effecting a more rapid following.

According to the invention, a control device of this kind is obtained which is of a very simple construction and has small dimensions by connecting the control member to the following member by means of a spring system which is put under tension as soon as these two members are displaced relatively to each other and is thus made to influence the said other contact device.

If in such control devices, the control member and the following member are so disposed as to be given any adjustment relatively to each other within a plane, it is convenient to construct the two contact devices in such a manner that, with each of them, one and the same movable part controls the movement of the following member according to the two coordinates of any plane coordinate system, a motor or a group of motors having to be provided for each of the said two movements.

In the said case, and when using motors in which each change of revoltuion requires a re-version of only one of the two current supplies (for instance when using reversible motors having two windings, the one working when the motor runs in the one and the other when the motor runs in the other sense), a convenient constructional form of the control device according to the invention will be obtained in the following manner. In each of the two contact devices (each of which is to be provided on one of the said two members), the contact group consists of two contact pairs so disposed relatively to each other that the contacts of each pair determine a straight line, the two straight lines intersecting each other, and are equidistant from the point of intersection of these straight lines. The movable part of the first said contact device, which is mounted on the same member as the appertaining stationary part and may be rotated about two axes at right angles to each other, contains a boss whose diameter is equal to a fraction of the distance apart of the contacts of a pair of contacts and which is disposed in a bore in a plate of the respective member, this plate being parallel to the said plane (in which the two members are displaced relatively to each other) and, when the movable part is in zero position, the front surface of the said boss lies in the plane of that side of the plate which faces the other of the said two members. The rotation of the movable part, which is necessary for the control, is effected by means of a pin. This pin, which is so mounted on this other member as to be displaceable at right angles to the said plane, is pressed by a spring against the front surface of the boss. The movable part of the other contact device is an annular body surrounding the appertaining stationary part and mounted on the same member as this stationary part in such a manner that its axis is at right angles, and may be displaced parallel, to the said plane relatively to the member. It is advisable to make the exterior rim of the said annular body conical and to provide the other of the said two members with a conical rim in such a manner that the apertures in the cones face each other. Accordingly, the above mentioned spring system is constructed as an annular spring of the form of a double cone suiting the said two cones and surrounding the said two rims.

To ensure a reliable working of the contact devices, it is advisable to make a spring act upon the movable part of each of these two devices in such a manner as to keep this part away from the appertaining stationary part.

When using motors in which each change of the sense of rotation makes it necessary to reverse the two current supplies, the contact devices must not be single but double contacts, or the single-contact supplies are to be equipped with relays doubling the contact and, eventually increasing the control current at the same time. An amplification of this kind may be effected also by means of a magnet coupling.

Figure 2:
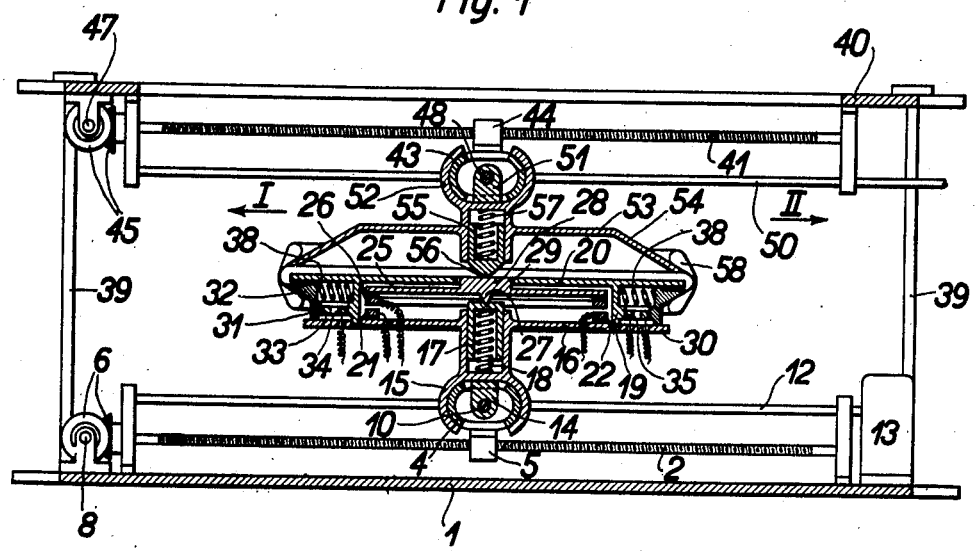
Figure 3:
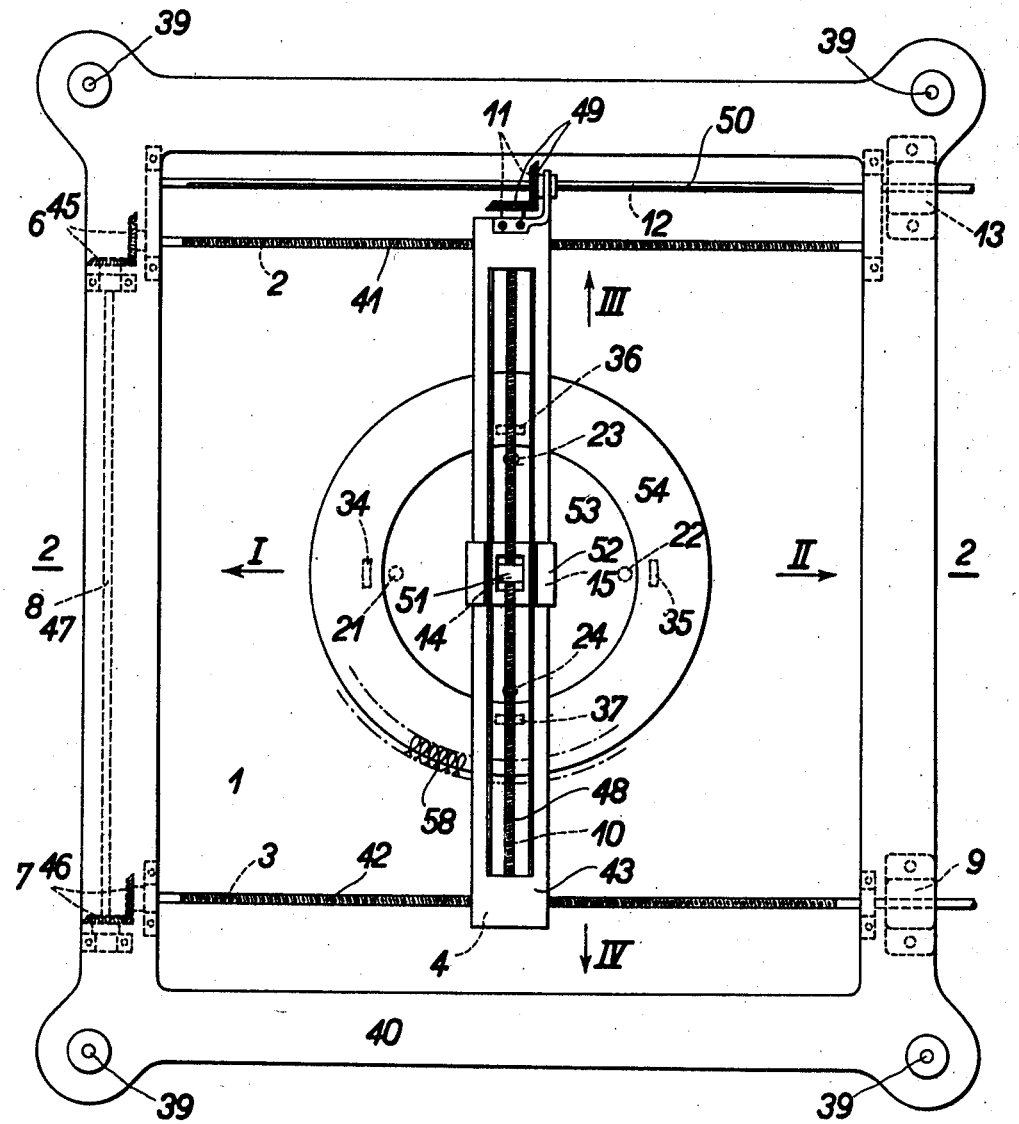

The accompanying drawings, which illustrates the invention, represents a control device in which the control member and the following member may be given in a plane any adjustment relatively to each other, each member being adjustable in two directions at right angles to each other. Figure 1 shows the electric diagram of the device. Figures 2 and 3 represent the device in a vertical section and in top plan view, respectively.

On a base plate 1 are rotatably mounted two threaded spindles 2 and 3 which are parallel to each other and mesh with nut pieces 5 fast with a slide 4. Two pairs of bevel wheels 6 and 7 and a shaft 8 interconnect the spindles 2 and 3 for equal rotation, this rotation being effected by a motor 9 acting upon the spindle 3. On the slide 4, a threaded spindle 10 is rotatably so mounted that its axis crosses those of the spindles 2 and 3 at right angles. Through the agency of a pair of bevel wheels 11 and a grooved shaft 12, the spindle 10 is driven by a motor 13. By means of a nut piece 14, the spindle 10 is in mesh with a slide 15 which contains a plate 16 parallel to the plane in which it is moving. In this slide 15 is also disposed a bush 17 displaceable at right angles to the said plane. This bush 17, which is closed at its upper end, contains a spring 18 that presses it away from the slide 15. The plate 16 is screwed to a housing 19 containing a cover plate 20 parallel to the plate 16. To the plate 16 are attached four contacts 21, 22, 23 and 24 whose contact surfaces lie in a plane parallel to the plate 16. The contacts 21, 22 and 23, 24 determine straight lines parallel to the spindles 2, 3 and 10, respectively. The appertaining control member of the contact device, which cooperates with all four contacts, is a ring 26 attached to a disc 25 mounted for universal movement in a bore in the front surface of the bush 17 by means of a point 27 and containing a boss 28 disposed in a bore 29 in the cover plate 20. To the housing 19 is screwed also a plate 30 parallel to the plate 16. Between the plates 30 and 20 is disposed an annular body 31 whose axis is at right angles to the plate 16 and which is displaceable between the plates 20 and 30. The exterior of the annular body 31 is provided with a conical part 32 in such a manner that the aperture of the cone faces the cover plate 20. In its interior, the annular body 31 has a contact ring 33 representing the control member cooperating with the four contacts 34, 35, 36 and 37 and pertaining to another contact device. These four contacts are attached to the housing 19 and their contact surfaces lie on a circular cylinder the axis of which is at right angles to the plate 16 and traverses the point 27. The contacts 34 and 35 determine a straight line parallel to the spindles 2 and 3 and the contacts 36 and 37, a straight line parallel to the spindle 10. Springs 38 between the housing 19 and the annular body 31 hold this annular body in a position in which the contact ring 33 is out of touch with all appertaining four contacts 34, 35, 36, and 37.

By means of columns 39, a plate 40 is rigidly connected to the base plate 1. On this plate are rotatably mounted two threaded spindles 41 and 42 which are parallel to each other and, through the agency of nut pieces 44, in mesh with a slide 43. Two pairs of bevel wheels 45 and 46 and a shaft 47 couple these spindles 41 and 42 to each other for equal rotation. On the slide 43, a threaded spindle 48 is rotatably so mounted that its axis crosses those of the spindles 41 and 42 at right angles. The spindle 48 is rotated by a pair of bevel wheels 49 and a grooved shaft 50. The spindle 42 and the grooved shaft 50 are assumed to be so connected to a measuring or analogous instrument supplying the movement of a member in rectangular coordinates that each of them is rotated according to the alterations of one of the two coordinates. By means of a nut piece 51, a slide 52 is in mesh with the spindle 48. The slide 52 has a housing 53 whose edge is provided with a conical part 54. In the said slide 52 is disposed a bush 55 with a conical end tapering to a point 56, this bush being displaceable relatively to the plane of displacement of the slide. A spring 57 presses the bush away from the slide 52, against the front surface of the boss 28 or against the cover plate 20. When the slides 15 and 52 assume such positions relatively to each other that the axes of the bushes 17 and 55 coincide, the points 27 and 56 lie in a straight line at right angles to the plane of displacement of the slides 15 and 52. When in this position, the point 56 is in touch with the centre of the front surface of the boss 28, as a consequence of which the disc 25 is made to assume such a position (its zero position) that the front surface of its boss 28 and the contact surface of its contact ring 26 are parallel to the said plane (and consequently to the plates 16 and 20). The pressures of the springs 18 and 57 work in such a way that, when the disc 25 is in its zero position, the front surface of the boss 28 lies in one plane with that surface of the cover plate 20 which faces the housing 53. The conical part 32 of the annular body 31 and the conical part 54 of the housing 53 are surrounded by an annular spring 58.

The described control device permits to displace the slide 52 (the control member) relatively to the slide 15 (the following member) in the directions of the arrows I, II, III, and IV. The movements of the slide 15 in the directions I and II are controlled by the motor 9, which has two windings 59 and 60 that are wound in opposite senses (Figure 1), and the movements of this slide 15 in the directions III and IV, by the motor 13 having two windings 61 and 62 also wound in opposite senses. When the motor 9 rotates clockwise, the slide 15 (or 4) moves in the direction of the arrow II. When the motor 13 is rotating clockwise, the slide 15 is displaced in the direction of the arrow III. In these cases the coil 60, or 61, is connected. When the motors 9 and 13 are rotating anti-clockwise, and this on account of the slide 15 being displaced in the direction of the arrow I, or IV, the windings 59 and 62 are connected. When the disc-contact device 21, 22, 23, 24, 26 is effective, the current flows through a series resistance 63 (Figure 1), the consequence being that the revolutions of the motors 9 and 13 are slow and a fine control of the following mechanism is attained. Contrary thereto, when the ring-contact device 33, 34, 35, 36, 37 is effective, the series resistance 63 is disconnected, the consequence being an increase of the numbers of revolution of the motors 9 and 13 and a coarse control of the following mechanism.

The control device works in the following manner. When turning the spindle 42 and the grooved shaft 50 by means of a measuring or analogous instrument and thus displacing the slide 52 from its zero position, in which it is exactly opposite the slide 15, the point 56 lying exactly opposite the point 27, all contacts being interrupted and the whole device without any current, the disc 25 is exposed to a lever effect, and the contact ring 26 of the fine control device is made to touch such two of the four contacts 21, 22, 23 and 24 as lie next to each other. As a consequence, the motors 9 and 13 are connceted and the slide 15 is controlled in such a manner that it follows the movements of the slide 52. When this slide 52 is moving slightly and slowly, the disc 25 oscillates about its zero position. When long and rapid movements are imparted to the slide 52, in which case the point 56 moves far away from and finally leaves the centre of the front surface of the boss 28 in order to glide on the cover plate 20, the annular spring 58 makes the contact ring 33 of the coarse-control device touch such two of the four contacts 34, 35, 36 and 37 as lie next to each other, the result being a disconnection of the series resistance 63 and a quicker rotation of the motors 9 and 13 until the point 56 approaches the front surface of the boss 28, and the fine adjustment is made to work.

I claim:

1. Control device for following mechanisms which comprise a control member and a following member coupled to a motor, the control member, when adjusted relatively to the following member, acting upon the said motor by means of an electric contact device and thus causing the following member to move in such a manner as to follow the control member, the said two members being so coupled to each other that, when the reciprocal adjustment of the said two members surpasses the definite value on account of too slow a following of the following member, another electric contact device is connected which effects a more rapid following of the following member, characterized by such a construction of the said two contact devices that one and the same part of each of these two devices controls the movement of the following member according to the two coordinates of any plane coordinate system, and further characterized by the feature that the said two members are coupled to each other by means of a spring system so constructed as to allow any reciprocal movements of the said two members within the plane of the said coordinate system and always tending to make the said two members assume that position which corresponds to the reciprocal displacement zero.

2. Control device for following mechanisms which comprise a control member and a following member coupled to a motor, the control member, when adjusted relatively to the following member, acting upon the said motor by means of an electric contact device and thus causing the following member to move in such a manner as to follow the control member, the said two members being so coupled to each other that, when the reciprocal adjustment of the said two members surpasses a definite value on account of too slow a following of the following member, another electric contact device is connected which effects a more rapid following of the following member, characterized by such a construction of the said two contact devices that one and the same part of each of these two devices controls the movement of the following member according to the two coordinates of any plane coordinate system, the contact group of the first said contact device consisting of two contact pairs so disposed relatively to each other that the contacts of each pair determine a straight line, the two straight lines intersecting each other, and that these contacts are equidistant from the point of intersection of these straight lines, the movable part of the said contact device being so mounted on the same member as the appertaining stationary part as to be rotatable about two axes at right angles to each other, the said contact device containing a boss whose diameter is equal to a fraction of the distance apart of the contacts of a pair of contacts and which is disposed in a bore in a plate that belongs to the respective member and is parallel to the plane of the said coordinate system, the front surface of the boss lying approximately in the plane of that side of the plate which faces the other of the said two members, the rotation of the movable part, which is necessary for the control, being effected by means of a pin which is so mounted on the said other member as to be displaceable at right angles to the said plane and to be pressed by a spring against the front surface of the boss, and further characterized by the feature that the said two members are coupled to each other by means of a spring system so constructed as to allow any reciprocal movements of the said two members within the plane and always tending to make the said two members assume that position which corresponds to the reciprocal displacement zero.

3. Control device according to claim 2, characterized by the feature that also the contact group of the said other contact device consists of two contact pairs so disposed relatively to each other that the contacts of each pair determine one of two intersecting straight lines and are equidistant from the point of intersection of these lines, and that the movable part of the said other contact device is an annular body surrounding the stationary part and mounted on the same member as this stationary part in such a manner that its axis is at right angles and that it is displaceable parallel to the said plane relatively to the member.

4. Control device according to claim 2, characterized by the feature that also the contact group of the said other contact device consists of two contact pairs so disposed relatively to each other that the contacts of each pair determine one of two intersecting straight lines and are equidistant from the point of intersection of these lines, and that the movable part of the said other contact device is an annular body surrounding the stationary part and mounted on the same member as this stationary part in such a manner that its axis is at right angles and that it is displaceable parallel to the said plane relatively to the member, the exterior rim of the said annular body being conical, the other of the said two members having a corresponding conical rim, the apertures of these two cones facing each other, and the said spring system being an annular ring of the form of a double cone suiting the said two cones and surrounding the said two rims.

5. Control device according to claim 1, characterized by the feature that a spring acts upon the movable part of each of the said two contact devices in such a manner as to keep this part away from the appertaining stationary part.

HEINRICH SONNBERGER.